(12) United States Patent
Nakajima et al.

(10) Patent No.: US 7,328,863 B2
(45) Date of Patent: Feb. 12, 2008

(54) COUNTERWEIGHT AND METHOD FOR RECYCLING THE SAME

(75) Inventors: Norio Nakajima, Tokyo (JP); Shuichi Kataoka, Hyogo (JP); Hiroshi Kumamoto, Kitakyushu (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 830 days.

(21) Appl. No.: 10/433,099

(22) PCT Filed: Aug. 26, 2002

(86) PCT No.: PCT/JP02/08586

§ 371 (c)(1),
(2), (4) Date: May 30, 2003

(87) PCT Pub. No.: WO03/029569

PCT Pub. Date: Apr. 10, 2003

(65) Prior Publication Data

US 2005/0111954 A1 May 26, 2005

(30) Foreign Application Priority Data

Sep. 28, 2001 (JP) .............................. 2001-301617
Feb. 7, 2002 (JP) .............................. 2002-031116

(51) Int. Cl.
*B02C 17/00* (2006.01)
*B02C 17/02* (2006.01)

(52) U.S. Cl. ...................................... 241/24.14; 241/30
(58) Field of Classification Search ............. 241/24.14, 241/24.1, 30
See application file for complete search history.

(56) References Cited

U.S. PATENT DOCUMENTS 5,181,803 A * 1/1993 Smith et al. .............. 405/129.9
5,961,055 A * 10/1999 Lehtinen .................. 241/24.14

FOREIGN PATENT DOCUMENTS

| JP | B2 60-42157 | 9/1985 |
|----|-------------|--------|
| JP | U 62-44966 | 3/1987 |
| JP | 06-264470 | 9/1994 |
| JP | 08-209748 | 8/1996 |
| JP | 11-200420 | 7/1999 |

* cited by examiner

*Primary Examiner*—Bena Miller
(74) *Attorney, Agent, or Firm*—Oliff & Berridge, PLC

(57) ABSTRACT

The present invention provides a counterweight and a counterweight-recycling method capable of having excellent workability, capable of reducing manufacturing costs, and capable of achieving environmental conservation. A metal portion contained in slag produced in an iron making process or in residue in a waste treatment furnace is used as a weight material of a counterweight (10). A method of recycling the counterweight (10) includes a removing step of removing an outer shell (15) of a used counterweight (10) that has used a magnetic metal portion as a weight material, a crushing/cutting step of crushing a filler containing the metal portion of the counterweight (10) from which the outer shell (15) has been removed and cutting a combined state between the metal portion and the other filler portion, and a separating step of separating processed products obtained in the crushing/cutting step into high-specific-gravity substances composed chiefly of the metal portion and into other low-specific-gravity substances, in which the high-specific-gravity substances are used as weight materials of a counterweight to be newly manufactured.

12 Claims, 5 Drawing Sheets

COUNTERWEIGHT AND METHOD FOR RECYCLING THE SAME

TECHNICAL FIELD

The invention relates to a counterweight mounted on a construction machine, such as a hydraulic shovel, and to a recycling method of the counterweight.

BACKGROUND ART

Generally, a construction machine, such as a hydraulic shovel, is provided with a counterweight used to maintain the balance of a machine body, for example, while the machine is operating. The counterweight is produced, for example, by filling the interior of a hollow outer shell made of sheet steel with a filler in which metal pieces (e.g., iron ore or iron pieces) used as weight materials are held together with cement or other materials.

Conventionally, the counterweight has been subjected to waste disposal after having been used. However, in recent years, an attempt to recycle the counterweight has been made in accordance with the promotion of recycling in many fields. In this case, a proposal has been made to recover the metal portion, which is great in specific gravity, from the used counterweight and then mix and use the metal portion with a filler of a new counterweight.

However, the counterweight and the recycling method have the following problems.

When a metal portion is recovered from a used counterweight by crushing and separating a filler into the metal portion and into the other filler portion, cement has easily been included in the metal portion. Therefore, cases have occurred in which the bulk specific gravity of recovered substances does not reach a given value, or the recovered substances do not have a bulk specific gravity usable as weight materials. Therefore, when such recovered substances are used to manufacture new counterweights, an operation to adjust the weight of each counterweight is needed, and, disadvantageously, much time is consumed because of low workability, thus raising manufacturing costs.

Additionally, when a brittle material like pig iron is used as a metal portion, the metal portion also is easily crushed in crushing a filler, and therefore the range of particle size distribution of the metal portion that has been recovered has had a tendency to be narrower than the range of the metal portion obtained when a new counterweight is manufactured. Hence, the bulk specific gravity of recovered substances becomes small, and cases have occurred in which the recovered substances do not have the bulk specific gravity usable as weight materials. Therefore, disadvantageously, much time is consumed because of low workability when new counterweights are manufactured, thus raising manufacturing costs.

Additionally, materials having low adsorptivity to a magnet are often contained in the metal portion, and therefore, when the metal portion is extracted from a used counterweight, a conventional drum-type magnetic separator of low peripheral speed/low magnetic force had the possibility that the recovered substances could not be easily separated from each other.

The invention has been made in consideration of the foregoing circumstances. It is therefore an object of the invention to provide a counterweight and a recycling method thereof capable of having excellent workability, capable of reducing manufacturing costs, and capable of achieving environmental conservation.

SUMMARY OF THE INVENTION

A counterweight according to a first aspect of the invention with the aforementioned object uses a metal portion contained in slag produced during an iron making process or contained in residue left in a waste treatment furnace as a weight material. Accordingly, because the metal portion contained in the slag or residue, which has conventionally been subjected to waste disposal, can be used as a weight material, the metal portion can be effectively used.

A counterweight according to a second aspect of the invention is characterized in that a metal portion obtained by crushing a used counterweight in which slag produced during an iron making process or a metal portion contained in residue left in a waste treatment furnace is used as a weight material is used as a new weight material. Accordingly, the metal portion contained in the slag or in the residue, which has conventionally been subjected to waste disposal, can be effectively used, and the metal portion can be recycled.

A method of recycling a counterweight according to the invention has a removing step of removing an outer shell of a used counterweight that has used a magnetic metal portion as a weight material, a crushing/cutting step of crushing a filler containing the metal portion of the counterweight from which the outer shell has been removed and cutting a combined state between the metal portion and the other filler portion, and a separating step of separating processed products obtained in the crushing/cutting step into high-specific-gravity substances composed chiefly of the metal portion and into other low-specific-gravity substances, in which the high-specific-gravity substances are used as a weight material of a newly manufactured counterweight. Accordingly, because the method has the removing step, the crushing/cutting step, and the separating step, bulk specific gravity usable as a weight material can be provided, and high-specific-gravity substances composed chiefly of a metal portion having substantially fixed bulk specific gravity can be easily recovered.

Preferably, in the method of recycling the counterweight according to the invention, the metal portion is a mass of metal recovered from slag produced in at least one of a blast furnace, a cupola furnace, a converter, and an electric furnace, or is a mass of metal contained in residue in a waste treatment furnace. Accordingly, because the metal portion contained in the slag or in the residue that has conventionally been subjected to, for example, waste disposal can be used as a weight material, the metal portion can be effectively used.

Preferably, in the method of recycling the counterweight according to the invention, large-sized metal pieces are removed by roughly crushing the filler containing the metal portion, and thereafter the remaining filler portion is further crushed so as to cut a combined state between the metal portion and the other filler portion in the crushing/cutting step. Thus, because the filler is first of all roughly crushed, the large-sized metal pieces that have difficulty in being recycled as weight materials can be easily removed from the filler. As the filler from which the large-sized metal pieces have been removed is further crushed after that, the filler can be easily crushed without the influence of the large-sized metal pieces.

Preferably, in the method of recycling the counterweight according to the invention, the processed products are separated into high-specific-gravity substances composed substantially of metal pieces and into low-specific-gravity substances by a magnetic separator of high peripheral speed/ high magnetic force in the separating step. Thus, because the processed products are put into a magnetic separator of high peripheral speed/high magnetic force so as to recover the high-specific-gravity substances composed substantially of metal pieces, the ratio of low-specific-gravity substances included in the high-specific-gravity substances can be reduced.

Preferably, in the method of recycling the counterweight according to the invention, the processed products are magnetically separated by a conventional magnetic separator, and the processed products separated onto a magnetic-substance side (i.e., side of magnetically attracted substances) are further separated by the magnetic separator of high peripheral speed/high magnetic force into high-specific-gravity substances composed substantially of metal pieces and into low-specific-gravity substances in the separating step. Thus, because the processed products are first of all magnetically separated so as to recover the processed products separated onto the magnetic-substance side, separable non-magnetic substances can be easily removed from the processed products. As the processed products are further put into the magnetic separator of high peripheral speed/high magnetic force so as to recover the high-specific-gravity substances composed substantially of metal pieces after that, the ratio of low-specific-gravity substances included in the high-specific-gravity substances can be reduced.

Preferably, in the method of recycling the counterweight according to the invention, the peripheral speed of the magnetic separator of high peripheral speed/high magnetic force is 300 to 500 m/min. Thereby, because the high-specific-gravity substances are magnetically attracted to the magnetic separator, and because the low-specific-gravity substances are blown off from the magnetic separator, separation accuracy between the high-specific-gravity substances and the low-specific-gravity substances can be improved.

Preferably, in the method of recycling the counterweight according to the invention, the magnetic flux density of the magnetic separator of high peripheral speed/high magnetic force is more than 4,000 gausses. Thereby, because the ratio of the high-specific-gravity substances magnetically attracted to the magnetic separator increases, separation accuracy between the high-specific-gravity substances and the low-specific-gravity substances can be improved.

Preferably, in the method of recycling the counterweight according to the invention, the processed products are separated by an air-blast separator into high-specific-gravity substances composed substantially of metal pieces and into low-specific-gravity substances in the separating step. Thus, because the high-specific-gravity substances composed substantially of metal pieces are recovered by putting the processed products into the air-blast separator, the ratio of the low-specific-gravity substances involved in the high-specific-gravity substances can be reduced.

Preferably, in the method of recycling the counterweight according to the invention, the processed products are magnetically separated by a conventional magnetic separator, and the processed products separated to the magnetic-substance side are further separated by the air-blast separator into high-specific-gravity substances composed substantially of metal pieces and into low-specific-gravity substances in the separating step. Thus, because the processed products are first of all magnetically separated so as to recover the processed products separated to the magnetic-substance side, separable non-magnetic substances can be easily removed from the processed products. As these processed products are further put into the air-blast separator so as to recover high-specific-gravity substances composed substantially of metal pieces after that, the ratio of the low-specific-gravity substances involved in the high-specific-gravity substances can be reduced.

Preferably, in the method of recycling the counterweight according to the invention, the wind power of the air-blast separator is 12 to 20 m/s. Thereby, because the ratio of the low-specific-gravity substances blown off by the wind power of the air-blast separator increases, separation accuracy between the high-specific-gravity substances and the low-specific-gravity substances can be improved.

BRIEF DESCRIPTION OF THE DRAWINGS

The invention will be described with reference to the drawings, in which.

PREFERRED EMBODIMENT OF THE INVENTION

An embodiment that embodies the invention will be described with reference to the attached drawings, thereby ensuring a better understanding of the invention.

Figure 1:
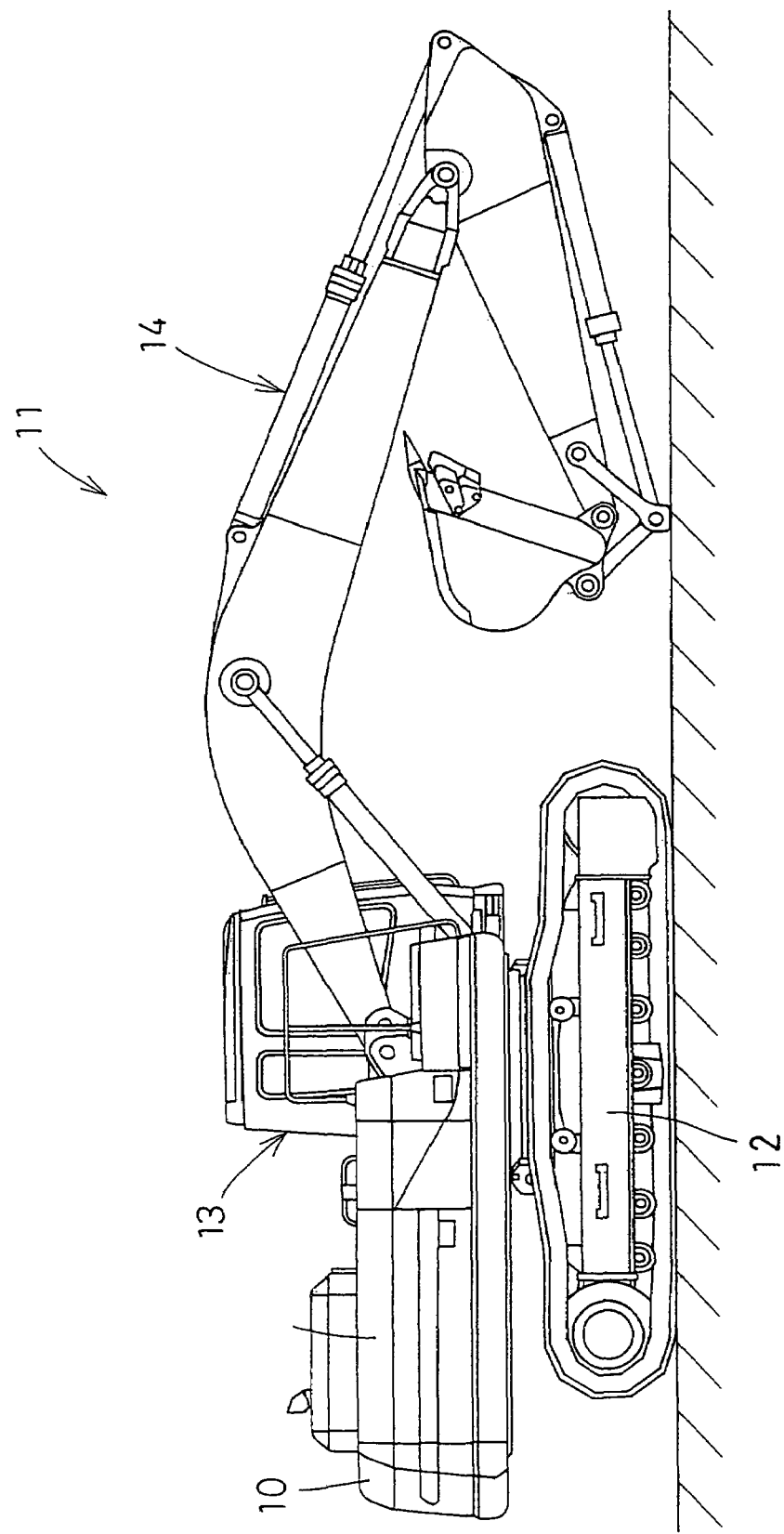
FIG. 1 is a side view of a hydraulic shovel that has a counterweight according to one embodiment of the invention.
Figure 2:
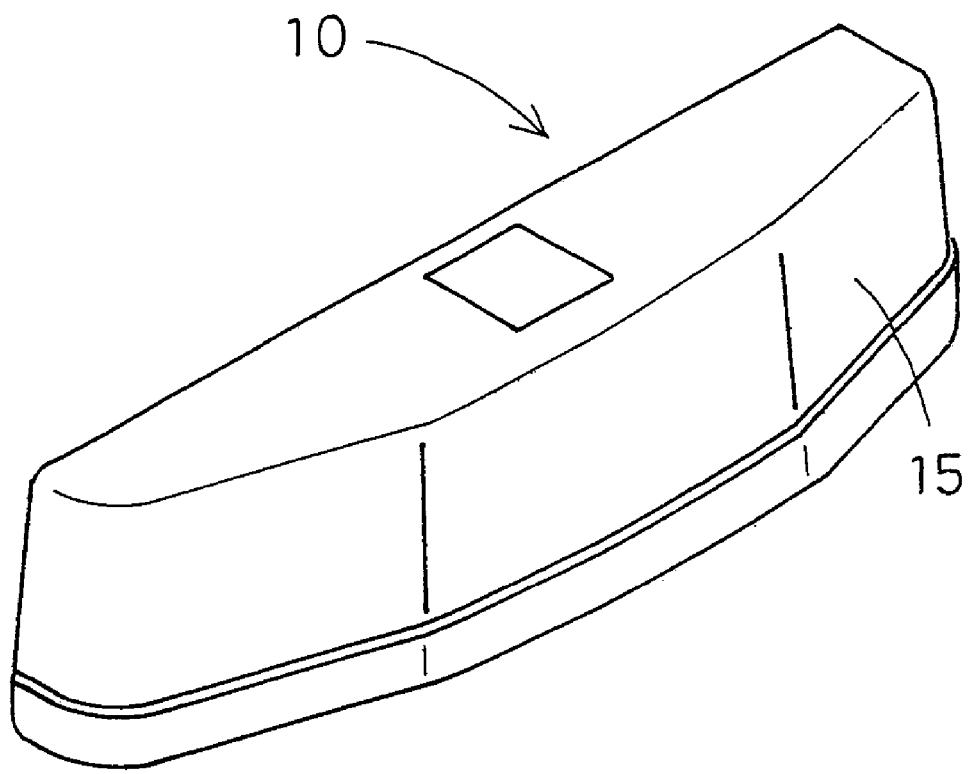
FIG. 2 is a perspective view of the counterweight.

As shown in FIGS. 1 and 2, the counterweight 10 according to one embodiment of the invention is mounted on the rear end portion of the hydraulic shovel 11 that is one example of a construction machine, and is used to maintain the machine balance of the hydraulic shovel 11 while the hydraulic shovel 11 is operating, for example. A detailed description thereof will be given hereinafter.

The hydraulic shovel 11 comprises a crawler-type lower structure 12, an upper structure 13 rotatably supported on the lower structure 12, and a front attachment 14 attached to the front part of the upper structure 13, and, in order to maintain a gravity balance with the front attachment 14 or a load (not shown), the counterweight 10 is mounted on the hydraulic shovel 11.

The counterweight 10 is structured by filling the interior of a hollow outer shell 15 made of sheet steel, that forms the outer part of the counterweight 10, with a filler. The filler is manufactured by holding together a metal portion, used as a weight material and iron pieces are one example of large-sized metal portion for weight adjustment, with cement, that is one example of other fillers. Concrete can be used as another filler.

The metal portion is a mass of metal recovered from manufacture-iron slag (one example of slag) produced when iron ore, cast iron, etc., are melted in an iron making process in a blast furnace or a cupola furnace, or is a mass of metal contained in residue produced when waste (garbage) is gasified in a waste treatment furnace. It is also possible to use, as a weight material in manufacturing a new counterweight, a metal portion obtained by crushing a used counterweight in which the metal portion, which was contained in the slag produced in the iron making process or which was contained in the residue in the waste treatment furnace, has been used as a weight material.

Because either metal portion left in the furnace can be easily obtained at a low price, the manufacturing costs of the counterweight 10 can be economically reduced.

The hydraulic shovel 11 ages by being used for a long time. When such an aging hydraulic shovel is salvaged, the counterweight 10 is recycled according to the following method.

Figure 3:
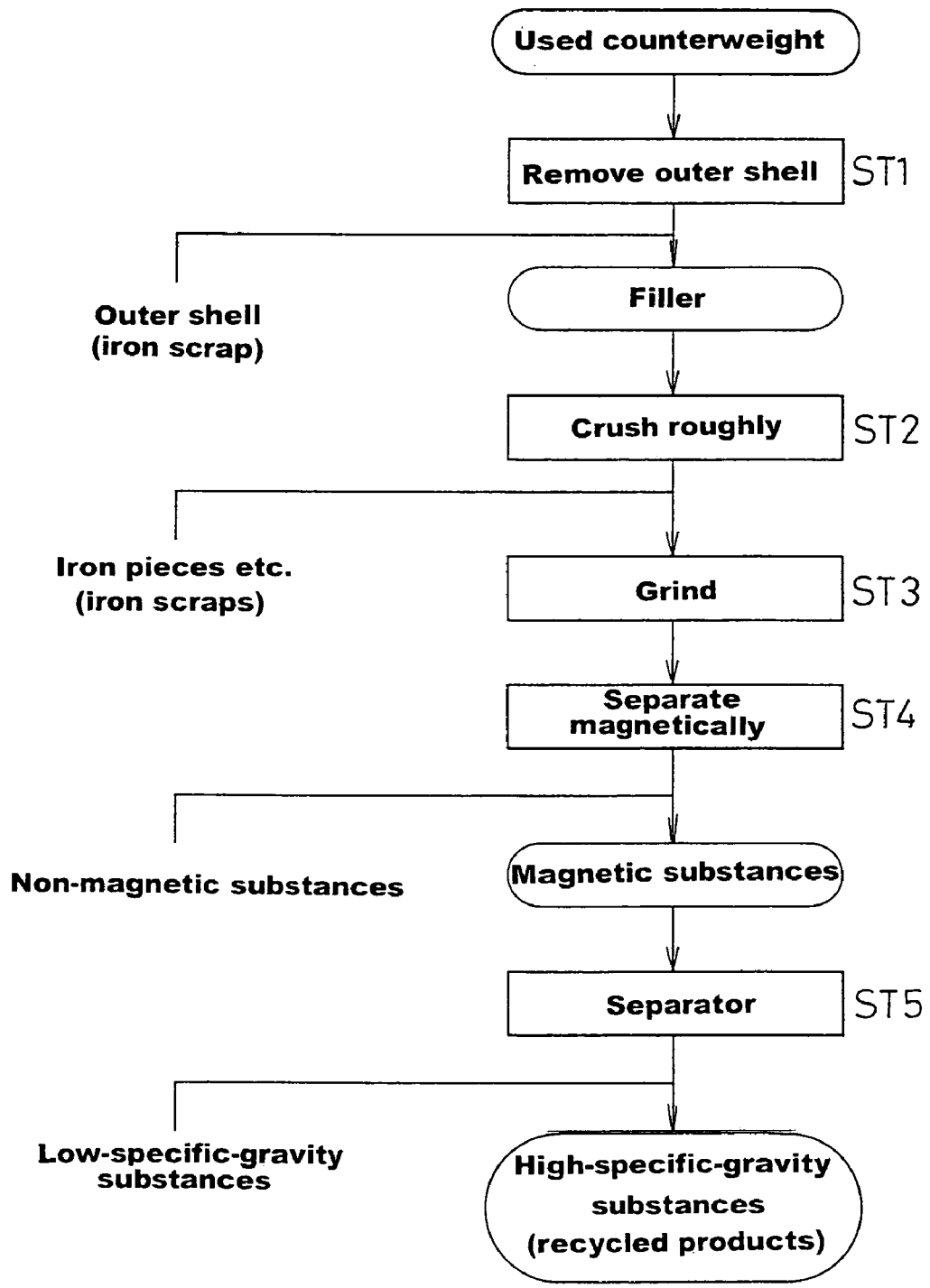
FIG. 3 is an explanatory drawing explaining a method of recycling a counterweight according to one embodiment of the invention.

As shown in FIG. 3, a method of recycling a counterweight according to one embodiment of the invention has a removing step of removing the outer shell 15 of the used counterweight 10 that has used a magnetic metal portion as a weight material, a crushing/cutting step of crushing a filler containing the metal portion of the counterweight 10 from which the outer shell 15 has been removed and breaking or destroying a combined state between the metal portion and the cement, and a separating step of separating processed products obtained in the crushing/cutting step into high-specific-gravity substances composed chiefly of the metal portion and into other low-specific-gravity substances (for example, non-magnetic substances and low-specific-gravity substances), in which the high-specific-gravity substances are used as weight materials for a newly manufactured counterweight. A detailed description thereof will be given hereinafter.

First of all, in step 1 (ST1), the counterweight 10 is detached from the aging hydraulic shovel 11. The outer shell 15, made of sheet steel, is then removed from the counterweight 10. Namely, the outer shell 15 is separated from the counterweight 10 with a crusher or the like, and, especially in a large-sized counterweight, the removing operation can be efficiently performed by separating the outer shell after partially cutting the outer shell with a gas cutting machine (melting machine) or a cutter. The removed outer shell 15 can be recovered as iron scrap and can be recycled (the foregoing description concerns the removing step).

In step 2 (ST2), the filler, from which the outer shell 15 has been removed, is roughly crushed into pieces each of which is about the size of a fist (5 to 15 cm in diameter), for example, with a crusher (breaker) or the like, and the separable iron pieces are removed. Steel materials are included as a large-sized metal portion to be roughly crushed and separated, and the removed iron pieces and steel materials are recovered as iron scrap and are recycled.

In step 3 (ST3), the remaining filler obtained by extracting iron pieces, steel materials, etc., from the roughly crushed filler is ground with a rod mill or a ball mill serving as a grinder so that the particle diameter is, for example, 7 mm or less, whereby a combined state between the metal portion and the cement is broken, namely dissolved. Crushing and grinding of the metal portion is minimal, and the cement, that performs its role as a binder of each particle that constitutes the metal portion, is chiefly crushed and ground. Thus, a combined state between the metal portion and the cement can be dissolved by appropriately controlling the crushing and grinding of the metal portion (the foregoing description concerns the crushing/cutting step).

In step 4 (ST4), the processed products that have been ground are magnetically separated by a conventional magnetic separator into magnetic substances and non-magnetic substances (one example of other low-specific-gravity substances). The magnetic separator used herein is a well-known drum-type magnetic separator of low peripheral speed/low magnetic force (i.e., DPT magnetic separator), and the peripheral speed of the drum can be set at about 120 m/min, and the magnetic flux density can be set at about 1,500 gausses (0.15 Tesla), for example. It is preferable to further sift and select the magnetic substances and to remove, as iron scrap, particles larger in particle diameter (for example, about 2 cm or more), i.e., particles that cannot be used as the metal portion. Thereby, it becomes possible to establish the bulk specific gravity of the metal portion at a more uniform value. Because non-magnetic substances are included in the magnetic substances, the processed products that have been separated onto a magnetic-substance side, i.e., the magnetic substances including the non-magnetic substances are further separated by the magnetic separator (separator) of high peripheral speed/high magnetic force into high-specific-gravity substances composed substantially of metal pieces and into low-specific-gravity substances (one example of other low-specific-gravity substances) in step 5 (ST5). The magnetic separator of high peripheral speed/high magnetic flux is a conventionally known magnetic separator, in which a plurality of magnets are arranged so that the polarities of adjoining magnets differing from each other are arcuately fixed inside a cylindrical drum that is rotated and driven by a rotating/driving source, whereby materials that fall onto the cylindrical drum are separated into magnetic high-specific-gravity substances and into non-magnetic low-specific-gravity substances.

Figure 4:
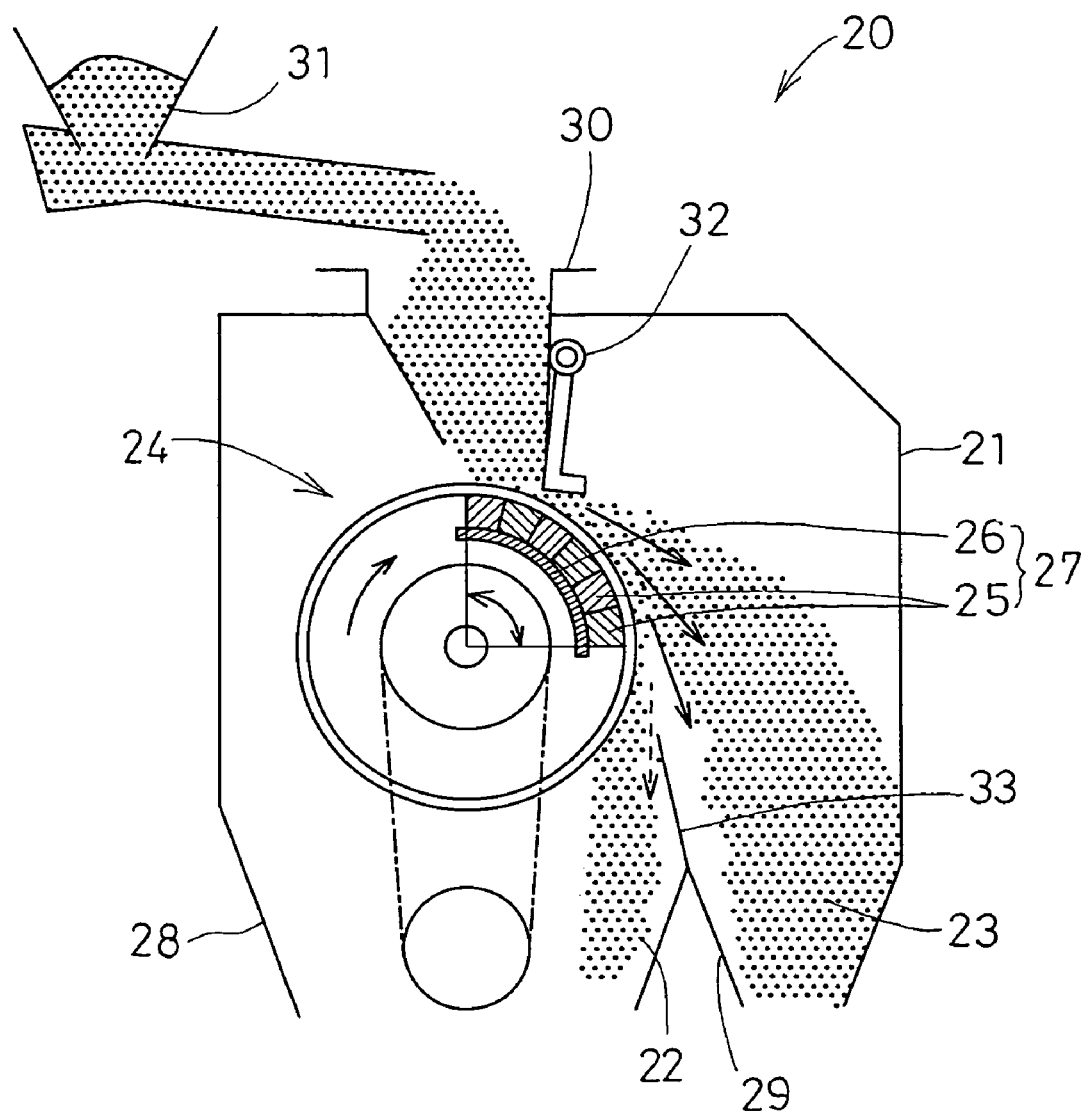
FIG. 4 is a front sectional view of a dry magnetic separator that is applicable to the counterweight-recycling method.

As shown in FIG. 4, a dry magnetic separator 20, as disclosed, for example, in Japanese Patent Application No. H10-309415, can be used as the magnetic separator of high peripheral speed/high magnetic flux. The dry magnetic separator 20 is rotatably provided in a casing 21, and includes a cylindrical drum 24 that allows materials consisting of magnetic substances 22 and non-magnetic substances 23 thrown from above to fall along the front surface, a magnetic-field generating mechanism 27 that is fixed and disposed to a magnet mounting plate 26 so that magnets 25 adjoining in the circumferential direction inside the cylindrical drum 24 have polarities different from each other and by which a magnetic field is generated on the surface of the cylindrical drum 24, and a magnetic-substance recovering part 28 and a non-magnetic-substance recovering part 29 that are disposed under the cylindrical drum 24 and recover the magnetic substances 22 and the non-magnetic substances 23, respectively, that are separated magnetically. A hopper 30 is used to direct raw materials to the upper part of the cylindrical drum 24 and is provided above the cylindrical drum 24. A feeder 31 used to feed the raw materials to the hopper 30 is provided above the hopper 30.

In the dry magnetic separator 20, the magnetic substances 22 among the raw materials, the amount of which is adjusted by a damper 32 and which is cast onto the cylindrical drum 24 rotating at high speed, are attracted by the magnetic field generated by the magnetic-field generating mechanism 27 onto the surface of the cylindrical drum 24. The non-magnetic substances 23 among the raw materials lie on the surface of the cylindrical drum 24. Thereafter, the magnetic substances 22 removed from the magnetic force of the magnetic-field generating mechanism 27 when inverted, are then separated from the surface of the cylindrical drum 24, and are recovered into the magnetic-substance recovering part 28. In contrast, the non-magnetic substances 23 are quickly separated from the surface of the cylindrical drum 24 because of the release from the magnetic substances 22 and because of the influence of a strong centrifugal force as the magnetic substances 22 are inverted, and are recovered into the non-magnetic-substance recovering part 29. The magnetic-substance recovering part 28 and the non-magnetic-substance recovering part 29 are divided by a partition plate 33.

In the magnetic separator of high peripheral speed/high magnetic force, the peripheral speed of the cylindrical drum is set to be 300 to 500 m/min, and the magnetic flux density is set to be more than 4,000 gausses (0.4 Tesla) in consideration of the state of substances to be separated, i.e., in consideration of whether the substances are easily attracted to the cylindrical drum, or in consideration of their shapes.

If the peripheral speed of the cylindrical drum is less than 300 m/min, the low-specific-gravity substances included in the high-specific-gravity substances cannot be blown off, and the high-specific-gravity substances cannot be sufficiently separated from the low-specific-gravity substances. Therefore, there is the possibility that the bulk specific gravity of recovered high-specific-gravity substances cannot reach a targeted value. On the other hand, if the peripheral speed of the cylindrical drum exceeds 500 m/min, the amount of the high-specific-gravity substances attracted onto the cylindrical drum decreases, and, uneconomically, the yield of the high-specific-gravity substances decreases. Therefore, in order to improve separation accuracy between the high-specific-gravity substances and the low-specific-gravity substances and to raise the yield of the high-specific-gravity substances, it is desirable to set the peripheral speed of the cylindrical drum at 350 to 500 m/min, and more desirably, 400 to 480 m/min.

If the magnetic flux density of the cylindrical drum is less than 4,000 gausses, and the peripheral speed of the cylindrical drum increases, the amount of the high-specific-gravity substances attracted onto the cylindrical drum decreases, and, uneconomically, the yield of the high-specific-gravity substances decreases. On the other hand, if the magnetic flux density is high, a fall in the amount of the high-specific-gravity substances attracted onto the cylindrical drum can be controlled in spite of the fact that the peripheral speed of the cylindrical drum increases, and therefore a specified upper limit value is not predetermined. However, it is desirable to set the upper limit value at 10,000 gausses, in consideration of the running cost of the magnetic separator of high peripheral speed/high magnetic force or in consideration of the performance of the device.

A conventionally known air-blast separator can be used instead of the magnetic separator having a high peripheral speed/high magnetic force. The wind power of the air-blast separator is set at 12 to 20 m/s in accordance with the state of the substances to be separated, i.e., their specific gravities or shapes.

If the wind power is less than 12 m/s, the low-specific-gravity substances included in the high-specific-gravity substances cannot be blown off, and the high-specific-gravity substances cannot be sufficiently separated from the low-specific-gravity substances. Therefore, there is the possibility that the bulk specific gravity of the recovered high-specific-gravity substances cannot reach a targeted value.

On the other hand, if the wind power exceeds 20 m/s, there is a high probability the high-specific-gravity substances will be blown off together with the low-specific-gravity substances. Therefore, not only can a sufficient separation between the high-specific-gravity substances and the low-specific-gravity substances not be made, but the recovering rate of the high-specific-gravity substances will decrease. Therefore, in order to improve separation accuracy between the high-specific-gravity substances and the low-specific-gravity substances and to raise the yield of the high-specific-gravity substances, it is desirable to set the wind power at 12.5 to 17 m/s, and more desirably, 13 to 15 m/s.

Accordingly, the magnetic substances recovered by the DPT magnetic separator can be easily separated into high-specific-gravity substances composed chiefly substantially of metal pieces and into the other low-specific-gravity substances (the foregoing description concerns the separating step).

The high-specific-gravity substances recovered according to the aforementioned method are mixed with a filler of a counterweight to be newly manufactured. Tests reveal the fact that 80% or more of a used counterweight can be recycled by mixing the high-specific-gravity substances with pieces recovered as iron scrap. Therefore, the manufacturing cost of the counterweight to be newly manufactured is reduced, and environmental conservation is achieved.

A description will be given of results for which the counterweight-recycling method according to the invention has been applied, and examinations have been made.

Preferably, a bulk specific gravity of 2.9 or more is achieved as the targeted value in order to use a recovered metal portion as a weight material of a counterweight.

Figure 5:
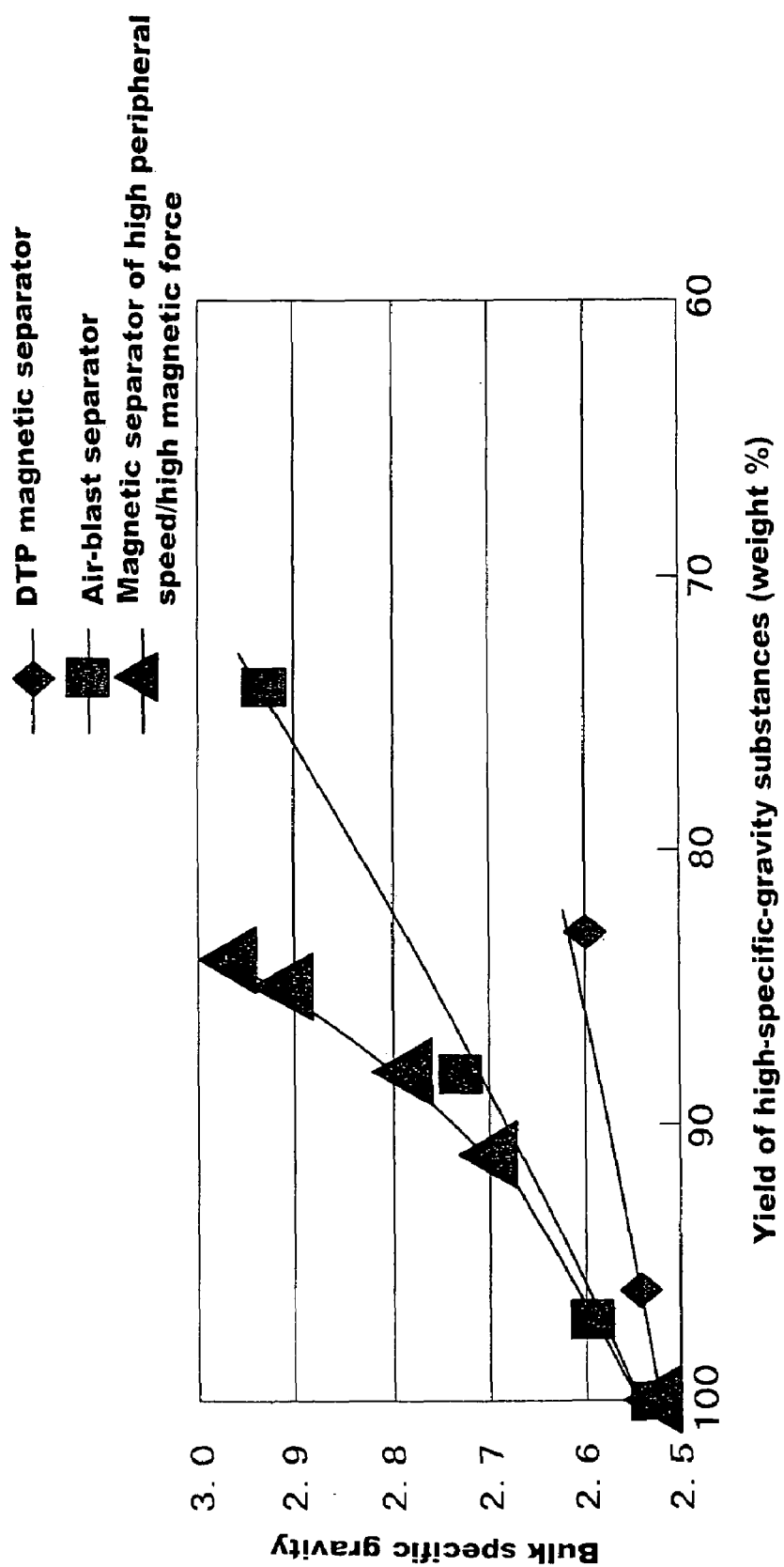
FIG. 5 is an explanatory drawing of examination results according to the embodiment.

Herein, the bulk specific gravities and the yields of the recovered high-specific-gravity substances are calculated and compared by use of a DPT magnetic separator, a conventionally known air-blast separator, and a magnetic separator of high peripheral speed/high magnetic force when processed products (before separation: bulk specific gravity 2.53) that have been recovered with the DPT magnetic separator and have been separated onto the magnetic-substance side are separated into high-specific-gravity substances composed chiefly of the metal portion and into the other low-specific-gravity substances (for example, cement). Examination results obtained by use of the DPT magnetic separator, the air-blast separator, and the magnetic separator of high peripheral speed/high magnetic force are shown in Tables 1 through 3, respectively, and in FIG. 5.

TABLE 1

| Case | Before separation | After separation | |
|---|---|---|---|
| | | 1 | 2 |
| Peripheral speed (m/min) | — | 120 | 200 |
| Yield of high-specific-gravity substances (%) | 100 | 96 | 83 |
| Bulk specific gravity | 2.53 | 2.54 | 2.60 |

TABLE 2

| Case | Before separation | After separation | | |
|---|---|---|---|---|
| | | 3 | 4 | 5 |
| Wind speed (m/s) | — | 7.8 | 10.3 | 13.9 |
| Yield of high-specific-gravity substances (%) | 100 | 97 | 88 | 74 |
| Bulk specific gravity | 2.53 | 2.59 | 2.73 | 2.93 |

TABLE 3

| Case | Before separation | After separation | | | |
|---|---|---|---|---|---|
| | | 6 | 7 | 8 | 9 |
| Peripheral speed (m/min) | — | 270 | 340 | 410 | 430 |
| Yield of high-specific-gravity substances (%) | 100 | 91 | 88 | 85 | 84 |
| Bulk specific gravity | 2.53 | 2.70 | 2.78 | 2.91 | 2.97 |

In Case 1 of Table 1, the DPT magnetic separator is normally used under the condition that the peripheral speed of the drum is set at about 120 m/min, and the magnetic flux density is 1,500 gausses (0.15 Tesla). Under these conditions, the bulk specific gravity is 2.54. From this, it is understood that the bulk specific gravity after separation almost never increases in comparison with the bulk specific gravity before separation. Additionally, in Case 2 of Table 1, the bulk specific gravity was raised to 2.60 by increasing the peripheral speed of the drum up to 200 m/min, but 2.9, which is the targeted value, could not be obtained.

In Case 4 of Table 2, using the air-blast separator, the bulk specific gravity reached 2.73 by increasing the wind power up to 10.3 m/s, and a value greater than that of the DPT magnetic separator was obtained, but 2.9, which is the targeted value, could not be obtained. However, the bulk specific gravity reached 2.93 by increasing the wind power up to 13.9 m/s. The obtained value is over the targeted value 2.9. At this time, the yield of the high-specific-gravity substances is 74 weight percent.

Using the magnetic separator of high peripheral speed/high magnetic force, examinations were made while fixing the magnetic flux density at 4,000 gausses (0.40 Tesla). As in Case 8 of Table 3, the bulk specific gravity reached 2.91 by increasing the peripheral speed of the cylindrical drum up to 410 m/min. The targeted value 2.9 was achieved. At this time, the yield of the high-specific-gravity substances was 85 weight percent. From this, it is understood that the yield was greatly raised in comparison with 74 weight percent of the air-blast separator in Case 5 of Table 2.

Additionally, as in Case 9 of Table 3, the bulk specific gravity could be further raised to be 2.97 by increasing the peripheral speed of the cylindrical drum up to 430 m/min. At this time, the yield of the high-specific-gravity substances was reduced only by about 1% in comparison with that of Case 8. From this, it is understood that a high yield was maintained. In other words, the bulk specific gravity and the yield of the high-specific-gravity substances can be raised by using the magnetic separator of high peripheral speed/high magnetic force.

From these results, it is understood that separation accuracy between the high-specific-gravity substances and the low-specific-gravity substances was improved by using the magnetic separator of high peripheral speed/high magnetic force, and the high-specific-gravity substances that were controlled not to mix with cement, which is the low-specific-gravity substance, could be recovered.

Therefore, the recovered high-specific-gravity substances can be mixed with a filler of a counterweight to be newly manufactured, and, economically, material costs are reduced.

The invention has been described in connection with the embodiment as mentioned above. However, without being limited to the structures mentioned in the embodiment, the invention includes other embodiments and modifications without departing from the scope of the invention as defined in the appended claims.

For example, the invention is applicable to a case in which the counterweight and the recycling method of the invention are structured by combining parts or all of the other embodiments and modifications together.

In the aforementioned embodiment, a case has been described in which the metal portion is a mass of metal recovered from manufacture-iron slag produced when iron ore, cast iron, etc., are melted in an iron making process in a blast furnace or a cupola furnace. However, for example, as another metal portion, use can be made of metal pieces recovered from slag produced in a converter and an electric furnace, or in at least two of either the blast furnace, the cupola furnace, the converter, and the electric furnace.

Additionally, in the aforementioned embodiment, a case has been described in which the processed products are magnetically separated by the DPT magnetic separator, and the processed products separated onto a magnetic-substance side are further separated by a magnetic separator of high peripheral speed/high magnetic force into high-specific-gravity substances and low-specific-gravity substances in the separating step.

However, one magnetic separator of high peripheral speed/high magnetic force or one air-blast separator can be used, or, alternatively, a plurality of magnetic separators of high peripheral speed/high magnetic force or a plurality of air-blast separators can be used in accordance with the amount of impurities to be mixed with the filler or the state (for example, specific gravity or shape) of the metal portion, without using the conventional magnetic separator. If a plurality of magnetic separators of high peripheral speed/high magnetic force are used, low-specific-gravity substances intermixed with the high-specific-gravity substances are gradually removed by gradually increasing the peripheral speed of each succeeding downstream magnetic separator and gradually increasing the magnetic flux density. If a plurality of air-blast separators are used, low-specific-gravity substances involved in high-specific-gravity substances are gradually removed by gradually increasing the wind power of each succeeding downstream air-blast separator. As a result, the bulk specific gravity or the recovering rate of the high-specific-gravity substances can be further raised.

Additionally, in the aforementioned embodiment, a case has been described in which the processed products are magnetically separated by the DPT magnetic separator, and then the processed products are further separated by the magnetic separator of high peripheral speed/high magnetic force or by the air-blast separator into high-specific-gravity substances and into low-specific-gravity substances in the separating step. However, the processed products can also be separated into high-specific-gravity substances and into low-specific-gravity substances by use of a wet-type device, namely a wet-type specific gravity separator, instead of the magnetic separator of high peripheral speed/high magnetic force or the air-blast separator.

In a counterweight, because a metal portion contained in slag or in residue that has conventionally been subjected to waste disposal can be used as a weight material, the metal portion can be effectively used. Therefore, economically, costs needed to manufacture the counterweight and costs needed for waste disposal can be reduced.

In a counterweight, a metal portion contained in slag or in a residue, which has conventionally been subjected to waste disposal, can be effectively used, and the metal portion can be recycled. Therefore, costs for manufacture of the counterweight and the costs of waste disposal are reduced, and environmental conservation is ensured by reducing waste.

In a method of recycling a counterweight, because a removing step, a crushing/cutting step, and a separating step are included, a bulk specific gravity usable as a weight material can be provided, and high-specific-gravity substances, composed chiefly of a metal portion including the substantially fixed bulk specific gravity, can be easily recovered. Therefore, because an operation to adjust the weight of each counterweight is not needed when new counterweights are manufactured, excellent workability is obtained, and manufacturing costs are reduced. Additionally, because a metal portion contained in a filler of a used counterweight can be recycled, a counterweight-recycling method can be provided by which environmental conservation is ensured by reducing waste.

In a method of recycling a counterweight, because a metal portion contained in slag or in residue that has conventionally been subjected to waste disposal is used as a weight material, the metal portion is effectively used. Therefore, economically, costs needed for waste disposal are reduced.

In a method of recycling a counterweight, because a filler is first of all roughly crushed, large-sized metal pieces that have difficulty in being recycled as weight materials can be easily removed from the filler. Because the filler from which the large-sized metal pieces have been removed is further crushed after that, the filler can be easily crushed without the influence of the large-sized metal pieces. Therefore, because separation accuracy between the metal portion and the other filler portion is improved, the bulk specific gravity of high-specific-gravity substances is raised, and the quality of counterweights to be manufactured is improved.

Additionally, because the filler is gradually crushed when a brittle material like pig iron is used as a metal portion, the metal portion is prevented from being roughly crushed when the filler is crushed. Therefore, because the range of a particle-size distribution of the metal portion that has been crushed is made almost the same as that of the metal portion obtained when the counterweight is manufactured, recovered substances can have bulk specific gravity usable as a weight material. Therefore, because recovered metal pieces are used without being subjected to any treatment when a new counterweight is manufactured, excellent workability is achieved, and manufacturing costs are reduced.

Additionally, because the filler that has been roughly crushed and from which large-sized metal pieces have been removed is further crushed, and because the crusher is not damaged by the metal pieces, economies are achieved.

In a method of recycling a counterweight because high-specific-gravity substances composed substantially of metal pieces are recovered by a magnetic separator of high peripheral speed/high magnetic force, the ratio of low-specific-gravity substances included in the high-specific-gravity substances are reduced. Therefore, because the high-specific-gravity substances are efficiently recovered from processed products, excellent workability is achieved.

In a method of recycling a counterweight, because processed products are first of all magnetically separated so as to recover the processed products separated onto the magnetic-substance side, separable non-magnetic substances are easily removed from the processed products. Because the processed products are further put into the magnetic separator of high peripheral speed/high magnetic force so as to recover the high-specific-gravity substances composed substantially of metal pieces after that, the ratio of low-specific-gravity substances involved in the high-specific-gravity substances are reduced. Therefore, because the processed products are gradually separated, the high-specific-gravity substances are efficiently recovered, and workability is excellent.

Additionally, because the metal pieces are attracted and recovered by the magnetic separator of high peripheral speed/high magnetic force when high-specific-gravity substances are extracted from a used counterweight, they are easily separated, and high-specific-gravity substances are efficiently recovered even when materials having low adsorptivity to a magnet are contained as the metal pieces.

In a method of recycling a counterweight, because high-specific-gravity substances are magnetically attracted to the magnetic separator, and because low-specific-gravity substances are blown off from the magnetic separator, separation accuracy between the high-specific-gravity substances and the low-specific-gravity substances is improved. Therefore, because the quality of the high-specific-gravity substances is improved, the recovered high-specific-gravity substances are easily used to manufacture a new counterweight, and the quality of a counterweight to be manufactured is improved.

In a method of recycling a counterweight, because the ratio of high-specific-gravity substances magnetically attracted to the magnetic separator is raised, separation accuracy between the high-specific-gravity substances and the low-specific-gravity substances is improved. Therefore, because the quality of the high-specific-gravity substances is improved, the recovered high-specific-gravity substances are easily used to manufacture a new counterweight, and the quality of a counterweight to be manufactured is improved.

In a method of recycling a counterweight, because processed products are put into an air-blast separator so as to recover high-specific-gravity substances composed substantially of metal pieces, the ratio of low-specific-gravity substances involved in the high-specific-gravity substances is reduced. Therefore, because the high-specific-gravity substances is efficiently recovered from the processed products, workability is excellent.

In a method of recycling a counterweight, because processed products are first of all magnetically separated so as to recover the processed products separated onto the magnetic-substance side, separable non-magnetic substances are easily removed from the processed products. Because the processed products are further put into the air-blast separator so as to recover the high-specific-gravity substances composed substantially of metal pieces after that, the ratio of low-specific-gravity substances involved in the high-specific-gravity substances is reduced. Therefore, because the processed products are gradually separated, the high-specific-gravity substances are efficiently recovered, and workability is excellent.

Additionally, because the high-specific-gravity substances are separated and recovered by the air-blast separator when the high-specific-gravity substances are extracted from a used counterweight, the high-specific-gravity substances are easily separated and are efficiently recovered even when materials having low adsorptivity to a magnet are contained in the metal pieces.

In a method of recycling a counterweight, because the ratio of low-specific-gravity substances blown off by wind power of the air-blast separator is raised, separation accuracy between the high-specific-gravity substances and low-specific-gravity substances are improved. Therefore, because the quality of the high-specific-gravity substances is improved, the recovered high-specific-gravity substances are easily used to manufacture a new counterweight, and the quality of a counterweight to be manufactured is improved.

The invention can be widely applied to a case where a counterweight mounted on a construction machine, such as a hydraulic shovel, is manufactured and to a case where such a counterweight is recycled. Workability is improved, manufacturing costs are reduced, and environmental conservation is achieved by carrying out the invention.

The invention claimed is:

1. A method of recycling a counterweight which was produced by using, as a filler, a metal recovered from slag generated from at least one of a blast furnace, a cupola furnace, a converter, and an electric furnace, or a metal contained in residue in a waste treatment furnace, and by using cement as a binder, wherein the method comprises:
   a crushing/cutting step including removing an outer shell of the used counterweight,
   a rough-crushing step including removing larger-sized metal portions contained in the filler from which the outer shell has been removed;
   a crushing/grinding step including crushing and grinding the filler from which the larger-sized metal portions have been removed, to break a combined state between the metal portion and the cement,
   a magnetic separation step including separating magnetic substances from the crushed and ground filler processed in the crushing/grinding step; and
   a specific gravity separating step including separating high-specific-gravity substances from the separated magnetic substances; and
   incorporating the high-specific-gravity substances as a filler in a new counterweight.

2. The method of recycling a counterweight as set forth in claim 1, wherein, in the specific gravity separating step, the magnetic substances separated in the magnetic separation step are further separated by a magnetic separator of high peripheral speed/high magnetic force into the high-specific-gravity substances which are composed substantially of metal pieces, and into low-specific-gravity substances.

3. The method of recycling a counterweight as set forth in claim 2, wherein a peripheral speed of the magnetic separator of high peripheral speed/high magnetic force is in the range of from 300 to 500 m/min.

4. The method of recycling a counterweight as set forth in claim 3, wherein a magnetic flux density of the magnetic separator of high peripheral speed/high magnetic force is more than 4000 gausses.

5. The method of recycling a counterweight as set forth in claim 2, wherein a magnetic flux density of the magnetic separator of high peripheral speed/high magnetic force is more than 4000 gausses.

6. The method of recycling a counterweight as set forth in claim 1, wherein, in the magnetic separating step, the filler processed in the crushing/grinding step are magnetically separated by a conventional magnetic separator, and, in the specific gravity separating step, magnetic substances separated in the magnetic separation step are further separated by a magnetic separator of high peripheral speed/high magnetic force into the high-specific-gravity substances which are composed substantially of a metal portion and into low-specific-gravity substances.

7. The method of recycling a counterweight as set forth in claim 6, wherein a peripheral speed of the magnetic separator of high peripheral speed/high magnetic force is in the range of from 300 to 500 m/min.

8. The method of recycling a counterweight as set forth in claim 6, wherein a magnetic flux density of the magnetic separator of high peripheral speed/high magnetic force is more than 4000 gausses.

9. The method of recycling a counterweight as set forth in claim 1, wherein, in the specific gravity separating step, the magnetic substances separated in the magnetic separation step are separated by an air-blast separator into the high-specific-gravity substances which are composed substantially of a metal portion and into low-specific-gravity substances.

10. The method of recycling a counterweight as set forth in claim 9, wherein a wind power of the air-blast separator is in the range of from 12 to 20 m/s.

11. The method of recycling a counterweight as set forth in claim 1, wherein, in the magnetic separating step, the filler processed in the crushing/grinding step are magnetically separated by a conventional magnetic separator, and, in the specific gravity separating step, magnetic substances separated in the magnetic separation step are further separated by an air-blast separator into the high-specific-gravity substances which are composed substantially of a metal portion and into low-specific-gravity substances.

12. The method of recycling a counterweight as set forth in claim 11, wherein a wind power of the air-blast separator is in the range of from 12 to 20 m/s.

* * * * *